May 3, 1927.

L. L. RECKLER 1,626,968

LIQUID CONTROL MEANS FOR HYDRAULIC BRAKES

Filed Nov. 11, 1925

INVENTOR
*L. L. Reckler*
BY
ATTORNEY

Patented May 3, 1927.

1,626,968

UNITED STATES PATENT OFFICE.

LAURENCE L. RECKLER, OF WESTWOOD, CALIFORNIA.

LIQUID-CONTROL MEANS FOR HYDRAULIC BRAKES.

Application filed November 11, 1925. Serial No. 68,320.

This invention relates to improvements in hydraulic braking apparatus such as is used in connection with four wheel hydraulic brakes as applied to numerous makes of motor vehicles, and particularly to the oil control mechanism for such apparatus.

As far as I am aware the movement of the oil to all such brakes is now controlled from a single cylinder, and a single plunger, the latter being operated by the brake pedal of the vehicle.

The result is that if any oil pipe leading from the cylinder to its brake, or any other oil holding member in the system should spring a leak from any cause, the entire braking system is temporarily rendered inoperative.

Since such an occurrence is liable to happen at any time, and would not be noted until an attempt was made to apply the brakes, the possibility of accidents arising from such contingency is of course very great.

The principal object of my invention therefore is to eliminate the possibility of leakage from putting the entire braking system out of commission by providing a control means for the oil which includes a cylinder and a plunger for each brake.

In this manner even though one or more of the individual oil pipes should be in a leaky condition, this will not affect the proper operation of the remaining brakes. At the same time all the plungers are arranged to be operated in unison, and means is provided for normally causing full equalization of the oil in all the cylinders.

A further object of the invention is to produce a simple and inexpensive device and yet one which will be exceedingly effective for the purpose for which it is designed.

These objects I accomplish by means of such structure and relative arrangement of parts as will fully appear by a perusal of the following specifications and claims.

In the drawings similar characters of reference indicate corresponding parts in the several views.

Figure 1:
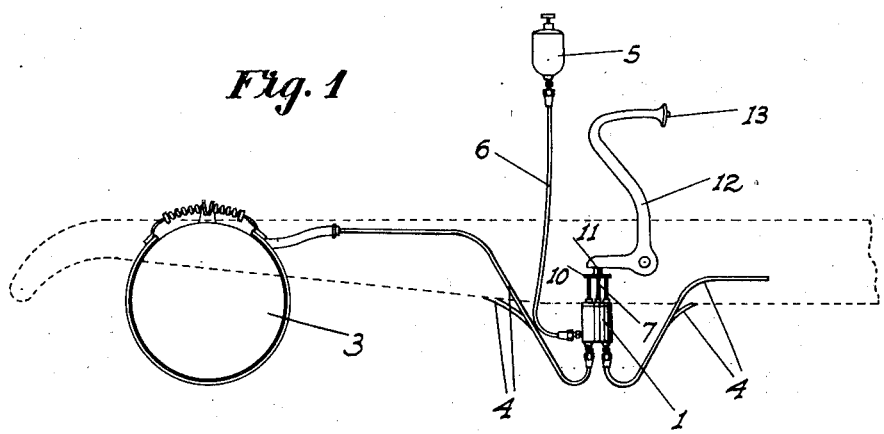
Fig. 1 represents a side elevation of my liquid control device, shown in connection with the operating pedal and with one of the brake drums.
Figure 2:
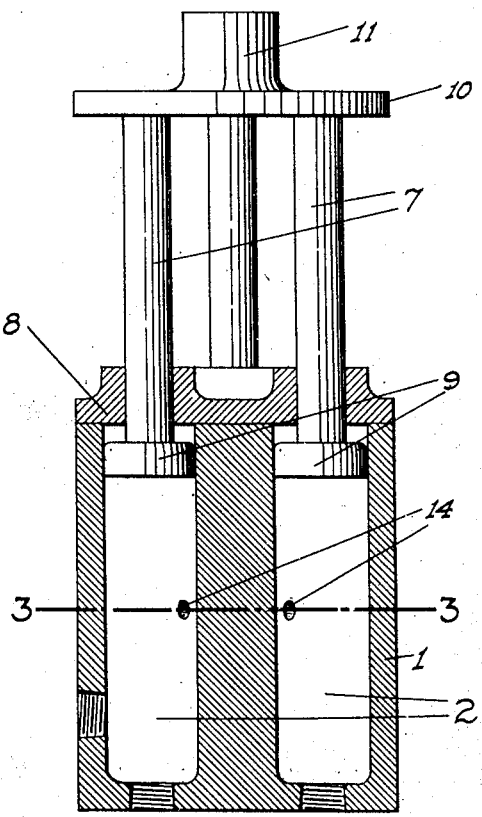
Fig. 2 is a sectional elevation of the cylinder and plunger unit detached.
Figure 3:
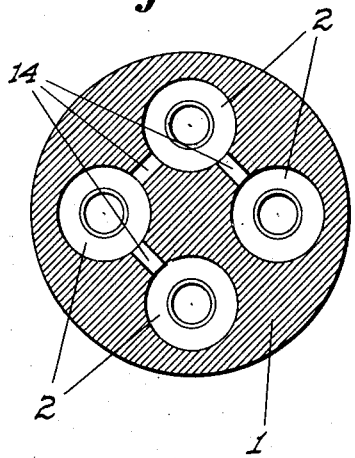
Fig. 3 is a cross section on the line 3—3 of Fig. 2.

Referring now more particularly to the characters of reference on the drawings, the numeral 1 denotes a block of suitable dimensions having four parallel cylinders 2 formed therein, one for each brake 3 of the car. The cylinders are vertically disposed and individual pipes 4 lead from their lower ends to the different brake structures, to operate the same by hydraulic pressure exerted on the oil in the pipes in the usual manner. The customary oil supply tank 5 may be provided in connection with the apparatus, with a pipe 6 leading to one of the cylinders, so that the oil supply in the latter may be renewed as the inevitable slight loss takes place with usage and wear. This feature however forms no part of my invention.

Plungers 7 are slidable through the top cap 8 of the cylinder block, with leather cups 9 on their inner ends impinging snugly against the walls of the cylinders.

The plungers outwardly of the cap are rigidly connected to a single head 10 having a stem 11 projecting centrally therefrom. This stem is adapted to be engaged by the lower end of a lever 12 of suitable form, having a foot pad 13 on its upper end. This lever, as usual with hydraulic brakes, takes the place of the ordinary service brake foot lever.

Intermediate the upper and lower limits of movement of the plungers, preferably not more than half way down, small passages 14 provide communication between the different cylinders. In operation therefore the oil level in the different cylinders will normally always be the same, insuring a fully equalized operation of the brakes. The entire piping system of the apparatus, the cylinders and the tank 5, are normally maintained completely filled with oil, so that with the depression of the plungers no backing-up of the oil into the tank can take place, and the braking action will not be interfered with.

If, however, a leak should develop in any pipe 4 or in the mechanism associated therewith, oil will of course be drained from the corresponding cylinder. The oil will also be drained to a certain extent from the other cylinders, but only to the level of the passages 14. This will then still permit three out of the four brakes being applied, the only difference being that the lever 13 will have to be depressed a greater distance than is normally the case, owing to the lowered level of the oil in the cylinders.

This greater depression will of course notify the operator that a leak has developed somewhere in the system, even if he is not made aware of that fact by the somewhat uneven braking action.

It will be seen however that the driver of the car can still bring his car to a stop more or less efficiently in such cases in contra-distinction to the absolute failure of the braking system with the ordinary form of control means used.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A fluid control means for hydraulic brake systems comprising a plurality of cylinders, having outlets for connection to individual pipes, plungers in the cylinders, a common means for enabling all said plungers to be operated simultaneously, the cylinders between the inner ends of the plungers and the outlets being arranged to be maintained filled with a liquid, there being communicating passages between the cylinders intermediate the limits of travel of the plungers.

In testimony whereof I affix my signature.

LAURENCE L. RECKLER.